United States Patent [19]
Deegan

[11] Patent Number: 5,828,334
[45] Date of Patent: Oct. 27, 1998

[54] PASSIVE AIRCRAFT AND MISSILE DETECTION DEVICE

[76] Inventor: Thierry Deegan, 39 Porter Ave., Portsmouth, R.I. 02871

[21] Appl. No.: 650,732

[22] Filed: May 20, 1996

Related U.S. Application Data

[63] Continuation-in-part of Ser. No. 336,920, Nov. 10, 1994, abandoned.

[51] Int. Cl.⁶ ...................................................... G01S 11/12
[52] U.S. Cl. ............................................. 342/90; 342/192
[58] Field of Search .............................. 342/90, 192, 193, 342/351, 460

[56] References Cited

U.S. PATENT DOCUMENTS

| | | | |
|---|---|---|---|
| 4,606,067 | 8/1986 | Ernst | 382/42 |
| 4,876,551 | 10/1989 | Climent et al. | 342/460 |
| 4,992,797 | 2/1991 | Gjessing et al. | 342/192 |
| 5,012,252 | 4/1991 | Faulkner | 342/192 |
| 5,124,709 | 6/1992 | Baron et al. | 342/192 |
| 5,430,448 | 7/1995 | Bushman | 342/192 |

FOREIGN PATENT DOCUMENTS 3255974  11/1991  Japan ........................................ 342/90

OTHER PUBLICATIONS

Klass; New Navy Radar Holds Promise of Long–Range Missile Detection; Aviation Week Aug. 17, 1959; p. 33; 342/460.

*Primary Examiner*—Stephen M. Johnson
*Attorney, Agent, or Firm*—Robert J. Doherty

[57] ABSTRACT

This invention offers the capability to passively detect and classify missiles, aircraft, and units with gas turbine engines and rocket motors. It does so by measuring the electromagnetic radiation from ions in the exhaust gas. These emissions are low in frequency and propagate beyond the visual horizon with little attenuation other than through wavefront spreading in the earth-ionosphere waveguide. Acoustic and mechanical processes in combustion chambers and turbines modulate the ion signals in a deterministic manner that makes the engine type classifiable. The proposed passive detection and classification device can sense and identify aircraft, missiles, and potentially ground vehicles and gunfire. This capability will reduce vulnerability of forces to threats and reduce fratricide among friendly units.

7 Claims, 2 Drawing Sheets

PASSIVE AIRCRAFT AND MISSILE DETECTION DEVICE

This application is a continuation-in-part of application Ser. No. 08/336,920 filed Nov. 10, 1994 now abandoned.

INTRODUCTION

Ships, air bases, manned fortifications, and masses of ground forces are valuable resources that must be protected. They must: use every means available to detect threat airplanes and missiles and to identify friendly forces nearby and in the line of fire. The novel sensor system of the present invention provides just such a capability.

Common air search sensor systems use active radar to detect threat platforms. Active transmissions compromise the security of the defended unit by emitting signals that can be detected by the threat. Passive means of detection, therefore, are desirable. Passive sensors are used to sense emissions of acoustic energy, radar frequencies, communications signals and infrared. Of these, radar and communications signal detection devices rely on the radiations emitted intentionally by the threat. To avoid detection the threat platform can restrict its radiated signals. Infrared emissions are generated by engine exhausts and skin-friction heat and are much more difficult to control than radar emissions, for example. However, infrared does not propagate beyond the visual horizon and can be substantially masked by rain, fog, clouds, and hills. Infrared cannot propagate beyond the visual horizon. Acoustic energy from engines propagates in the air but atmospheric attenuation is substantial. Thermal gradients in the air column causes refraction of sound and wind causes unpredictable distortion and shadow zones.

BACKGROUND OF INVENTION

There is an observable phenomenon that is caused by the molecular kinetics in gas turbines, rocket engines and other combustion processes where some of the gases are ionized. These ions are the means for this invention to operate. From elementary physics, any acceleration of a charge causes the electrostatic field to be distorted and electromagnetic radiation to be produced. The source strength of the radiation generated by a partially ionized gas is directly proportional to the number of ions present which is, in turn, a function of temperature, fuel rate, and the type of fuel used. The proportion of fuel molecules ionized in a simple hydrocarbon flame is on the order of $10^{-8}$. The acceleration of ions causes an electromagnetic radiation with a strength that can be computed with Larmor's Formula.

$$\text{Power} = \frac{\text{charge}^2 \text{ acceleration}^2}{6 \text{ pi } e_o c^3} \text{ Watts}$$

Where $e_o$=free space permittivity=$8.85 \times 10^{-12}$ Coulombs/N m$^2$ c=speed of light=$3 \times 10^8$ meters per second Ions that are accelerated by several mechanisms in the engine radiate electromagnetic waves at frequencies that are a function of the source of the acceleration. The frequencies generated are related to mechanical characteristics of the engine that make the platform classifiable, that is, the type and class of aircraft can be determined by identifying the engine. Rocket combustion chambers are hotter than hydrocarbon-fueled engines and produce approximately ten times more ions on a volume basis. This makes them stronger radiators than aircraft engine with an equivalent thrust. Additionally, the ions created are unique to rocket fuels and make rockets easily classifiable.

Detectable radiation from ions is from four causes. The first is cyclotron radiation caused by the earth's magnetic field. The field imposes a force on the ion that accelerates it. This force causes each ion to radiate at a the cyclotron frequency or gyrofrequency determined by $$\text{frequency} = \frac{\text{charge} \times \text{magnetic field}}{2 \text{ pi} \times \text{mass}}$$

For example an ionized carbon atom has a mass of 12 atomic mass units and radiates at approximately 53 Hertz in the earth's surface magnetic field of 40,000 nanoteslas. Ionized molecules with greater mass radiate at lower frequencies. Soot precursors and soot particles are made up of many molecules, some fraction of which will be ions. This gives some of these particle a net charge and their large mass results in their having a gyrofrequency below 10 Hz.

The second source of ion acceleration and radiation is acoustic or hydrodynamic acceleration of ions to produce electromagnetic radiation that emulates the spectrum of the sounds made by the engine. A gas-turbine engine's exhaust chamber has characteristic length, diameter, nozzle area ratio, and gas temperature that control the acoustic pressure field inside. This pressure field determines the acoustic wave patterns that are superimposed on the gas flow as it exits the engine. These wave patterns accelerate the gas and the ions entrained in the gas are accelerated along with the gas. The accelerated ions radiate at frequencies that are those of the acoustic wave patterns. Because the geometry of each type of engine is slightly different these frequencies are different across engine types. Engine types are related to aircraft types because certain engines are built for aircraft types. The frequencies, therefore, provide clues to identify the type of engine and aircraft.

In rocket engines, the combustion chamber has several dominant acoustic frequencies that are also driven by the geometry of the chamber. The primary frequencies are the longitudinal and radial expansion frequencies of the chamber's structural envelope. The chamber itself, under the action of the pressure wave commencing from the igniter and reflecting from the constriction of the nozzle, acts as a spring. It stretches and contracts longitudinally and expands and contracts radially with natural frequencies controlled by the elasticity of the material and the dimensions of the chamber's walls. Every rocket type has this set of dominant frequencies. As these longitudinal and radial expansions and contractions occur, the volume of the chamber is changed slightly and the gas stream flowing out of the nozzle is alternately augmented and diminished by the gas flow attributable to this volume change. The gas flow through the nozzle has superimposed on it a modulation of these pulsations. Because each rocket type has a unique chamber geometry it has a unique set of modulations imposed upon its exiting gas stream. The ions entrained in this gas stream are accelerated by the modulations and radiate at the frequencies of the pulsations.

The third source of acceleration is from the turbulence of the stream of gas after exiting from the engine's nozzle. As the stream from the nozzle interacts with the static gas of the atmosphere it forms a characteristic fluid velocity field called a jet. The jet is a distribution of gas motion that gradually distributes the energy of the exhaust flow into the atmosphere. A characteristic of such jets that pertains to the present invention is the turbulence of the gas. The gas is generally laminar as it exists but it very quickly transitions to turbulent flow with certain dominant velocity factors and dimensions of the jet that are a function of the speed of the aircraft and the velocity of the jet in the throat of the nozzle.

The ions entrained in the exhaust gas are accelerated by the turbulence and radiate at the frequencies characteristic of the turbulence. These frequencies are related to the nozzle diameter and the relative velocity of the jet to the surrounding air. These frequency elements are also often related to engine types and aircraft types and provide additional clues to classify the aircraft that is the source of the emissions. In so far as most gas turbine engines on aircraft operate with roughly similar nozzle diameters and exhaust velocities, the turbulence field does not have dominant class-distinguishing characteristics, except for differentiating supersonic from subsonic aircraft. The prominent features of the emissions from turbulence are their strength and their broadband nature. The stable broadband emission makes it distinguishable from the non-Gaussian background noise and is useful for an initial search parameter in a wide detection sweep.

The fourth source of ion frequencies is mechanical acceleration of ions due to throttling in nozzles and flow alteration by turbines. Throttling produces a relatively low frequency signal and turbine modulation produces frequencies that are related to the number of blades on the turbine, the number of stator vanes, afterburner structures that the gas must pass, and the rotational rate of the engine. The gas flow disturbances are repeated with every turn of the engine and produce ion emissions that are similarly related to the turbine mechanisms and its shaft rate. The frequencies generated are stable with engine power and are distinct for each engine type.

The frequencies expected from all these sources are between 10 and 50 Hz for the cyclotron radiation of individual ions, 100 to 5000 Hz for emissions from jet turbulence and engine core resonances, and 10 kHz or above for mechanical modulating sources such as turbine blade passing frequencies. Atmospheric absorption losses for these frequencies are on the order of one decibel in 100 kilometers and spreading losses are limited by the waveguide effect of the earth-ionosphere cavity. These small loss factors imply that modest signal sources may be detectable at significant distances.

Ambient noise in the frequency range of the signals of interest is dominated by lightning. This broadband, impulsive, and highly variable source complicates the process of detecting engine emissions. The signal analysis techniques used by certain shore-to-submarine communications systems can be applied to detecting the combustion emissions at great distances. These techniques overamplify the signal and clip the extremes of the signal range. The zero-crossings of the resulting clipped signal are then used to extract frequency information. The stable frequencies of engine emissions make them detectable far below the ambient noise level because the noise is non-Gaussian and man-made sources are deterministic in their narrowband characteristics. The stability of these emissions from rocket chambers and turbine engines make them immediately classifiable. This classification capability also can provide a differentiation of friend from foe.

The invention detects aircraft by sensing the electromagnetic waves produced by these various ion sources above discussed. The accelerated ions radiate at frequencies characteristic of the type of engine and its fuel. Measuring the frequency content of these emissions allows aircraft signals to be picked out of the ambient noise field that is also sensed by an electromagnetic instrument. The present invention has an antenna to sense the field and processing electronics to identify the spectral characteristics of the measured emissions. Differentiating these spectral features allows aircraft to be identified and classified as to their type.

Several existing patents address techniques for detecting missiles and aircraft. Kressler's U.S. Pat. No. 5,053,622 uses a particle beam from a satellite to provide an illumination that triggers differing responses by missiles and decoys in flight. The present invention uses no illumination source and senses the electromagnetic emissions that are emanating from a missile's engine and exhaust plume.

Maxwell's U.S. Pat. No. 3,023,310 uses a mass spectrometer, which uses an ion's trajectory in a strong magnetic field to differentiate elements, in a sampling device that detects the hydrocarbon exhaust gases from nearby snorkeling diesel submarines. The present invention does not capture an exhaust gas sample, nor does it measure mass by its deflection in a magnetic field. It measures mass by sensing the electromagnetic emission and computing mass from the ratio of charge and mass as indicated in the frequency measured.

Fletcher's U.S. Pat. No. 3,931,516 is for a particular type of mass spectrometer to identify the constituents of particles in space. It requires that the particles being measured strike a detector, rather than measuring characteristics of the matter remotely, as in the present invention.

Martin's U.S. Pat. No. 3,982,713 addresses calculation of missile trajectories by measuring the radiation, mostly ultraviolet light, from gasses in the near proximity of the missile's body. It does not measure any characteristics of the combustion gasses in the missile's engine as in the present invention.

Wesley's U.S. Pat. No. 4,703,179 is for a sensor to measure infrared or electro-optical radiation. It does not measure the frequencies relevant to the cyclotronic or acousto-mechanical frequencies that are germane to the present invention.

Spector's U.S. Pat. No. 4,765,244 measures near-infrared, far-infrared, and ultraviolet light emissions from missiles in conjunction with radar proximity information to detect and localize a missile. While the source of the ultraviolet radiation detected by the sensor is provided by the engine and exhaust plume of the missile, no characteristics of the radiation other than its presence and Doppler shift are used in that sensor's algorithms. In the present invention, measurement and decypherment of the characteristics of the radiation are the heart of the invention.

Burke's U.S. Pat. No. 5,162,649 measures the constituents of materials by inferring their mass from the time it takes ions to traverse a tube with an electric field gradient. The present invention does not use an artificially applied electric field to conduct its measurements nor does it measure particulate motion between an injection grid and a detection grid.

Bushman's U.S. Pat. No. 5,430,448 senses the flicker of ultraviolet radiation in an exhaust plume and radio frequencies from nose shocks and blade-tips to detect and classify aircraft. It differs from the present invention in that it does not identify a source of the radiation from combustion ions in the exhaust stream. Neither does it identify turbulence in the jet as a source of broadband radio frequency radiation. It mentions blade-tip shocks as a source of ultra-violet radiation but does not consider the modulation of the bulk exhaust by the turbine that produces a narrowband emission at the (audio-range) frequency of the blade rate of the final stage of the turbine.

U.S. Pat. No. 4,606,067 held by Ernst, Brabants's U.S. Pat. No. 3,210,762 and Apsotolos' U.S. Pat. No. 4,701,762 describe radio direction finding and signal correlation techniques that could be used as part of the present invention to determine the direction from the sensor to the source. The present invention is not a particular means of such direction finding.

Faulkner's U.S. Pat. No. 5,012,252 and Gjessing's U.S. Pat. No. 4,992,797 illustrate methods of target classification that employ types of signal analysis and feature extraction to identify targets from radiated and/or reflected signals. Elements of either of these patents and others like it. illustrate the state of the art in contact classification techniques. They can be employed to process the combustion-emission signals that are at the core of the present invention. They do not have any unique means of aircraft detection, as in the present invention.

BRIEF DESCRIPTION OF THE DRAWING

The accompanying drawing

GENERAL DESCRIPTION OF THE PREFERRED EMBODIMENT

Figure 1:
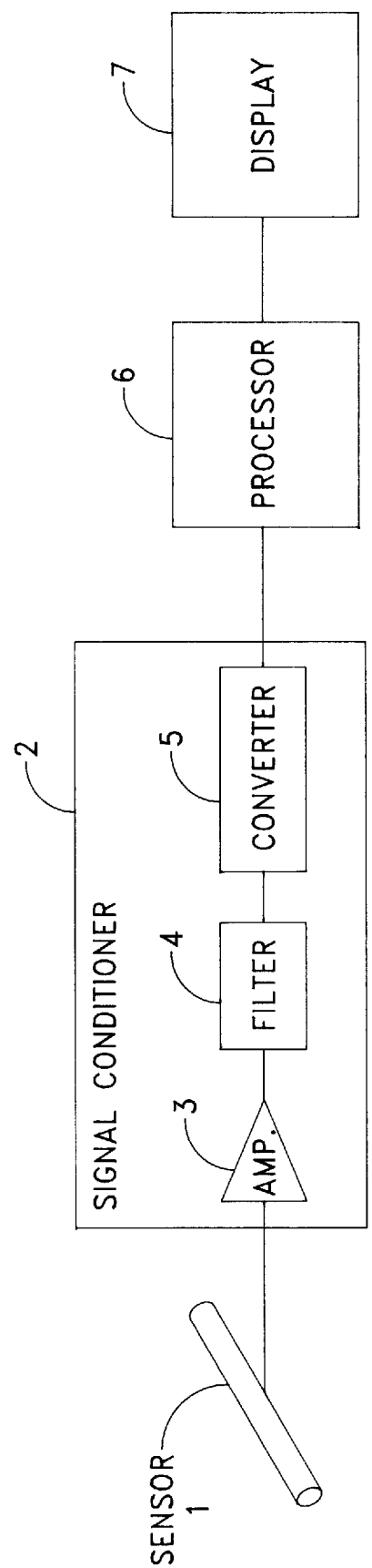
FIG. 1 illustrates the major features of the present invention. It also shows the flow of signals through the device as would occur with it in operation.

Referring to FIG. 1, there is shown a block diagram of the passive missile detection device. It can be likened to any electromagnetic or radio receiver device that has a sensor 1, that is a simple antenna, such as a loop antenna, that is suitable for detecting the very low cyclotronic frequencies of the ions. The sensor feeds a signal conditioner element 2, that contains an amplifier stage 3, and a filter 4. The amplifier boosts the signal from the antenna to a level that is usable by the remainder of the instrument. The filter eliminates information outside the band of interest and particularly reduces the potential for aliased frequencies in the digitally sampled data. The band of interest for cyclotron frequencies caused by the earth's magnetic field for ions and particles is on the order of 0.01 Hz to 50 Hz, making interference from 60 Hz ambient power-line noise significant and important to exclude by filtering. The filter may be assembled from passive components in any one of the many commonly used analog filter configurations such as a multi-pole elliptic filter, with the number of poles selected to provide the requisite attenuation rate with frequency outside the pass band. The filter may also be a series of active operational amplifiers tailored with external components to set the pass band and stop bands. The signal passing through the filter is sent to an analog-to-digital converter 5 that samples the sensor data at an appropriate rate and delivers it to the signal processor 6. The mechanism that performs the conversion is immaterial. Conversion may be accomplished with a successive-approximation or switched-capacitor converter or another type of converter that provides a digital output from the analog input. It is common for such signal conversion equipment to include an input gain amplifier with an automatic gain control function to ensure that the input signal fills a significant number of bit places in the output data stream. The resulting stream of digital bit data is fed to signal processor 6 where it is first stored in a digital memory for further use.

The signal processor performs spectrum analysis, integration, and level detection. This processor can be electronics specifically designed to execute the required data manipulations or it can be a general-purpose computer or a digital signal processor that perform the calculations through a set of stored computer programs. Spectrum analysis measures the energy in a large number of frequency bins that have very small width in the frequency domain. This sub-division of the frequency band of interest allows individual frequency features to be distinguished. There are many techniques in the art for performing the spectrum analysis, any one of which can perform the required operation on the sample data set. The Fast Fourier Transform is one such method commonly used for this function.

The integrator sums several successive measurements which causes ion signal to add together and noise to sum toward zero. The result is an improved ratio of signal to noise with an increasing number of samples integrated. The integrator can be implemented with several mechanism, including dedicated accumulators or the use of memory in a computer-based instrument. In a computer program implementation of the processor, the result of the Fast Fourier Transform of a sample is a set of amplitude values over the processed frequency band. A search for a signal 10 Hz wide between at 10,000 Hz requires a sampling rate of roughly 25,000 samples per second. The first set of samples is passed through ;a Fast Fourier Transform that calculates 1000 frequency bins for the 10,000 Hz frequency band. Each bin contains a value of the signal and noise energy sensed in a band 10 Hz wide. Averaging subsequently sampled sets' bin values in turn causes zero-mean noise to average out and signal energy to accumulate. The ratio of signal to noise increases with the number of sample sets thus integrated. A heightened signal-to-noise ratio makes the signal stand out from the noise and be more detectable. The spectrum data are passed to a level detector and to the display 7 for operator interpretation.

The level detector compares the integrated spectral data with a threshold level. When there are signal values above the threshold the level detector declares a detection and identifies the bin or bins with signals in excess of the threshold in a message to the display device. This process may also be a processor built of dedicated hardware or implemented in software running in a general-purpose computer. A second function associated with the level detector is the quantization of the output of the integrator. In this process the difference between the lowest and the highest value of the integrated data set is matched with the dynamic range of the display device. The display range of interest may be stroke amplitude on a display screen or gradations of color or shading. Effective quantization allows the data to be displayed to best advantage.

The display 7 is a set of video driver electronics to format the data for display and a cathode ray tube monitor that presents the spectrum. The most common presentations expected to be used for displaying spectral data are those that show the value of detected signal energy in each bin over the band of interest. Aircraft emit a family of frequencies, some of which are from cyclotronic radiation from soot, soot precursors, and combustion ions. Other narrowband frequencies are caused by tail-pipe chamber acoustic action and gas velocity modulation by turbine blades. These frequencies appear on the screen as spikes in amplitude versus frequency traces. Broadband energy emissions are characteristic of jet turbulence and appear on an amplitude trace as an elevated level across many adjacent frequency bins. The signature of an aircraft is sufficiently distinct with a mix of narrowband and broadband attributes to be detectable by an observer monitoring a spectrum display.

DESCRIPTION OF ALTERNATIVE EMBODIMENTS

Figure 2:
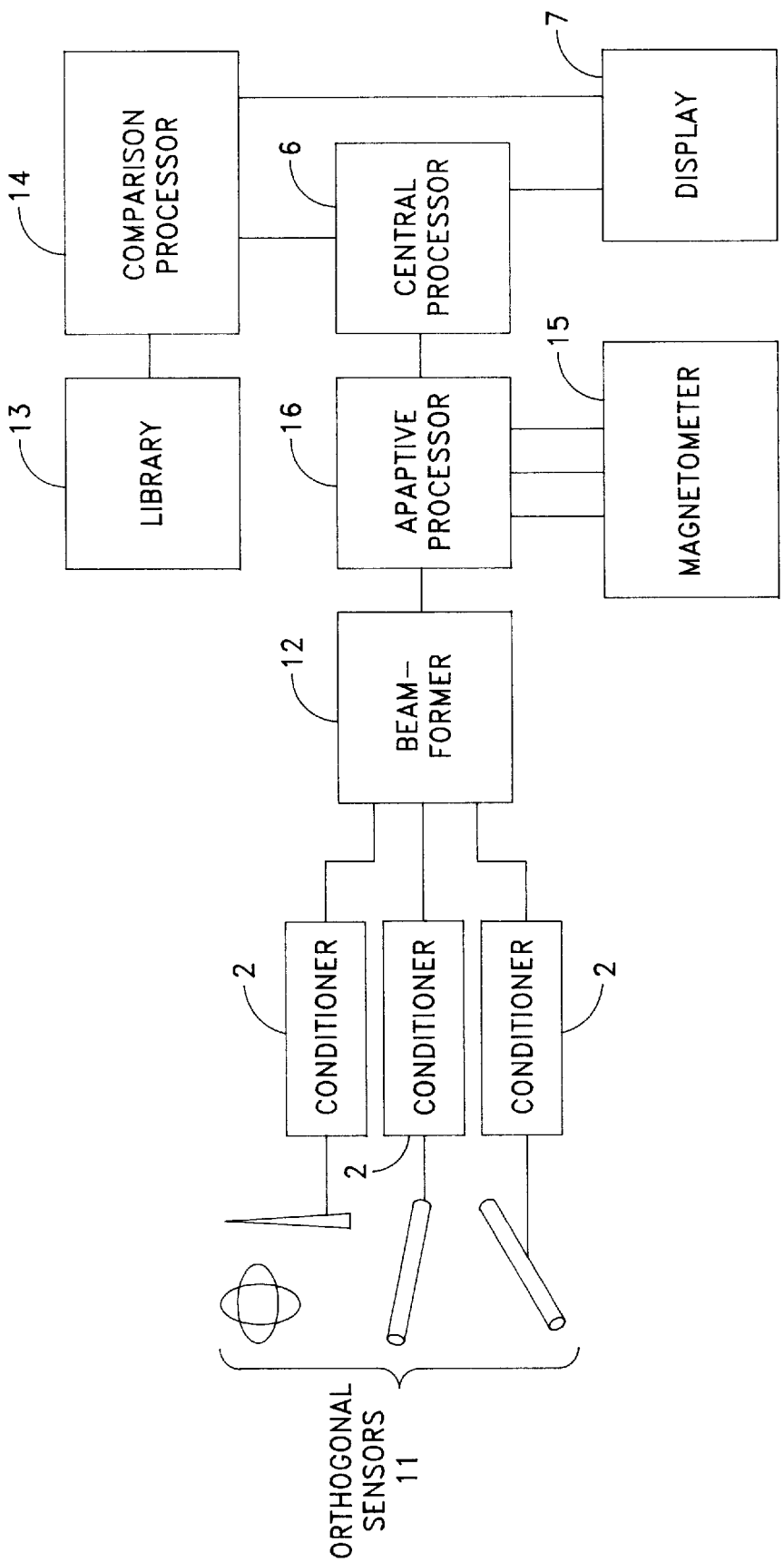
FIG. 2 shows an alternate embodiment of the invention.

Several extensions of the present invention can be made to improve its performance for detection or to have it classify or localize the detected aircraft. They are illustrated in FIG. 2.

Detection from a single, plain antenna can be improved through the use of multiple antennas whose outputs are used concurrently to perform direction finding and to exclude noise from other directions. The sensor suite of the device can include crossed loops 10, crossed dipoles with an orthogonal monopole 11, or another configuration of antennas that have a demonstrable directionality. Each antenna element has a pattern of sensitivity with respect to azimuthal direction and, as in FIG. 1, the signal from the sensors are fed to the signal conditioning elements 2 and their directionality is used to form detection beams in a processor called a beamformer 12. The beamformer may be purpose-built electronics or an algorithm that manipulates the digitized sensor data in a computer. The beams, by virtue of their having a maximum response axis on one direction and lesser sensitivity in other directions, exclude interference due to the local ambient electromagnetic noise field from those other directions. The elimination of noise improves the ratio of signal to noise and makes aircraft signals in the beam more pronounced and more easily detected. The second benefit from a multiple antenna sensor suite is that the direction of arrival of the emission signal from the aircraft can be determined. The direction from the receiving system to the emission source can be used to determine the location of the source aircraft. Two receiver instruments separated by some distance can produce a triangulated range. Other techniques that use the curvature of the emission wavefront can also be used to determine range. Such techniques are all within the state of the art and may be implemented within the present invention in hardware processors or software algorithms.

The spectral characteristics of the emissions can be used to identify the type of engine and to infer the type of aircraft or missile carrying it. Such a process in military target detection systems is called classification. Classification clues, that is sets of related frequencies or other associated spectral characteristics can also be used to reinforce a detection made on broadband characteristics. That is, a tentative detection can be confirmed by identifying several spectral features that are clear indicators of an aircraft source. Examples of such confirming features are a set of narrowband emissions that include tailpipe resonances, turbine blade-rate frequencies, and a stable combustion-ion signals all received simultaneously. If they are received simultaneously from the same bearing, there is further confirmation that the signal set has common aircraft or missile source. The process of classification can be manual, wherein the process of relating known clues to received signals is performed by an operator. An automated classifier has a stored library of aircraft signatures 13 that is used in a classification comparison processor 14. The classification processor compares the signatures in the library with the signal set received. When a match is found, the results are presented to the operator on the display 7.

The integration of signals over time in the detection processor 6 improves the signal-to-noise ratio of the instrument but it does so at a cost. In the time it takes to collect an advantageous number of samples the variation of the earth's magnetic field causes the frequencies of ion emissions to drift. The drifting causes the signals from ions of interest to be spread and made less distinct in the spectrum. The spreading can be reduced by including a magnetometer sensor 15 and an adaptive processing stage 16 in the sensor signal train of the device. The magnetic field measurement is taken at the same time as the samples of the ion sensors. This measurement is used to adjust the sensors' signal frequency by computing it with the measured magnetic field value, rather than at the fixed mean field value. This causes the integrating samples to be placed in frequency bins determined by the measured magnetic field value, rather than the assumed and constant field value. The adaptive frequency adjustment offsets the frequency spreading influence of the varying magnetic field and allows the instrument to maintain high frequency resolution with long samples.

What is claimed is:

1. A method of passively detecting aircraft and missiles having engines which form exhaust streams by measuring the electromagnetic emissions caused by accelerating ions that have been generated by combustion in the engines of said aircraft and missiles, wherein related spectral features of said measured emissions are used to classify the distinctive type of said engine, said spectral features being indicative of the number of turbine blades, stator vanes, chamber geometry, nozzle ratio and dynamic properties of said engine.

2. A method of passively detecting aircraft and missiles having engines which form exhaust streams by measuring the electromagnetic emissions caused by accelerating ions that have been generated by combustion in the engines of said aircraft and missiles, wherein the spectral features of said measured emissions are related to a library of similar signals from known sources to classify the emissions as emanating from a threat or non-threat aircraft.

3. A passive aircraft detection device, comprising:
   a means of sensing the electromagnetic emissions from accelerated combustion ions;
   a means of measuring the energy level of said emissions in the frequency regime of said ions accelerated by exhaust turbulence, turbine blade modulation, and engine resonances;
   a means of measuring the frequency content of said emissions in the frequency regime of said ions accelerated by said turbine blade modulation and said engine resonances; and
   a means to relate said emission energy levels and measured frequencies to previously measured emissions so as to identify the fact that said emissions are from a combustion engine.

4. The passive aircraft detection device of claim 3 that also provides classification information, said device comprising the elements of claim 3 and further comprises a means to correlate said emission energy levels and frequency measurements to previously measured emission signal patterns so as to identify the type of engine generating said emissions.

5. The passive aircraft detection device of claim 3 in which said measured combustion ion emission signals have a direction of arrival to said device which direction of arrival corresponds to the direction of said emitting engine to said device, said device also providing direction-finding information, said device comprising the elements of claim 3 and further comprises a means to determine the direction of arrival of said measured combustion ion emission signals so as to determine the direction to said emitting engine from said detection device.

6. The method of passively detecting aircraft and missiles by measuring the electromagnetic emissions caused by accelerating ions chemically generated in engine combustion to determine the frequency spectrum of such emissions and thereafter relating said spectrum to frequencies representative of cyclotron emissions from combustion ions, engine resonances, exhaust jet turbulence, and engine turbine blade-rate modulations of the jet to determine the presence or non-presence of said aircraft or said missile, wherein related features of the broadband spectrum of jet turbulence, modulations due to resonances in the combustion chamber and nozzle, and narrowband blade-rate frequencies superimposed on the jet are compared with a library of similar signals from known sources to classify the engine type of the source.

7. The method of passively detecting aircraft and missiles by measuring the electromagnetic emissions caused by accelerating ions chemically generated in engine combustion to determine the frequency spectrum of such emissions and thereafter relating said spectrum to frequencies representative of cyclotron emissions from combustion ions, engine resonances, exhaust jet turbulence, and engine turbine blade-rate modulations of the jet to determine the presence or non-presence of said aircraft or said missile and wherein said electromagnetic emissions have a direction of arrival corresponding to the direction of said aircraft and missiles to the receiver, and further measuring said direction of arrival of said electromagnetic emissions so as to determine the direction of said aircraft or said missile from said receiver.

* * * * *